(12) United States Patent
Burger

(10) Patent No.: US 12,090,009 B2
(45) Date of Patent: Sep. 17, 2024

(54) SUPRA STRUCTURE ABUTMENT HOLDER AS WELL AS PROCESS FOR PROVIDING A BONDING GAP

(71) Applicant: Ivoclar Vivadent AG, Schaan (LI)

(72) Inventor: Goran Burger, Grabs (CH)

(73) Assignee: Ivoclar Vivadent AG, Schaan (LI)

( * ) Notice: Subject to any disclaimer, the term of this patent is extended or adjusted under 35 U.S.C. 154(b) by 646 days.

(21) Appl. No.: 16/468,934

(22) PCT Filed: Nov. 17, 2017

(86) PCT No.: PCT/EP2017/079588
§ 371 (c)(1),
(2) Date: Jun. 12, 2019

(87) PCT Pub. No.: WO2018/108447
PCT Pub. Date: Jun. 21, 2018

(65) Prior Publication Data
US 2019/0336251 A1 Nov. 7, 2019

(30) Foreign Application Priority Data
Dec. 15, 2016 (EP) ..................... 16204291

(51) Int. Cl.
*A61C 13/12* (2006.01)
*A61C 8/00* (2006.01)

(52) U.S. Cl.
CPC ............ *A61C 13/12* (2013.01); *A61C 8/0057* (2013.01); *A61C 8/0066* (2013.01); *A61C 8/0089* (2013.01)

(58) Field of Classification Search
CPC ... A61C 8/0066; A61C 8/0057; A61C 8/0089; A61C 3/20; A61C 3/16; A61C 3/166;
(Continued)

(56) References Cited

U.S. PATENT DOCUMENTS 285,977 A * 10/1883 Dennis ................. A61N 1/0548
433/215
442,733 A * 12/1890 Shampel ................... B25B 1/02
269/238

(Continued)

FOREIGN PATENT DOCUMENTS

AU 2020201437 B2 * 12/2021 ............ A61C 8/008
CA 243548 A 10/1924
(Continued)

OTHER PUBLICATIONS

English translation of CH388218A. (Marcel Wahli, Parallelschraubzwinge) Feb. 15, 1965. Espacenet [retrieved on Aug. 5, 2021]. (Year: 1965).*

(Continued)

*Primary Examiner* — Heidi M Eide
*Assistant Examiner* — Holly T. To
(74) *Attorney, Agent, or Firm* — Ann M. Knab; Thad McMurray

(57) ABSTRACT

The invention concerns a supra structure abutment holder for holding an arrangement of supra structure 16 and abutment 14, with a clamping device 12 for the arrangement, and is characterized in that clamping device 12 is adjustable in its height relative to an auxiliary device 26, in particular via threads.

8 Claims, 2 Drawing Sheets

(58) Field of Classification Search
CPC ....... A61C 13/12; A61C 13/20; A61C 13/081; A61C 5/80; B25B 5/109; B25B 1/02; B25B 1/24; B25B 1/2468; B25B 1/2489; B25B 5/068
USPC .............. 433/215, 119, 173; 269/15, 24, 27
See application file for complete search history.

(56) References Cited

U.S. PATENT DOCUMENTS

| | | | | |
|---|---|---|---|---|
| 455,136 A * | 6/1891 | Vanderman | B25B 1/02 | 269/130 |
| 468,000 A * | 2/1892 | Tomek | B25B 5/068 | 81/118 |
| 488,600 A * | 12/1892 | Cowell | B25B 1/24 | 269/283 |
| 490,112 A * | 1/1893 | Guenther | A47J 47/005 | 269/240 |
| 812,128 A * | 2/1906 | Griffith | B25B 1/24 | 254/106 |
| 957,520 A * | 5/1910 | Stearns | B25B 1/24 | 269/247 |
| 983,580 A * | 2/1911 | Taggart | A61C 13/20 | 164/308 |
| 996,113 A * | 6/1911 | Mosley | A61C 3/16 | 269/142 |
| 1,106,815 A * | 8/1914 | Hopkins | A61C 5/85 | 433/153 |
| 1,176,548 A * | 3/1916 | Harpin | A61C 3/00 | 433/144 |
| 1,177,706 A * | 4/1916 | Johnson | A61C 5/85 | 433/161 |
| 1,191,637 A * | 7/1916 | Whiteley | A61C 13/20 | 249/83 |
| 1,414,647 A * | 5/1922 | Ivory | A61C 5/80 | 433/139 |
| 1,464,807 A * | 8/1923 | Clark | A61C 13/12 | 72/409.13 |
| 1,520,992 A * | 12/1924 | Wills | B25B 27/023 | 269/86 |
| 1,554,899 A * | 9/1925 | Vick | B25B 1/24 | 269/86 |
| 1,561,359 A * | 11/1925 | Schleicher | B25B 5/109 | 269/243 |
| 1,732,790 A * | 10/1929 | Craigo | A61C 13/12 | 72/409.13 |
| 1,806,147 A * | 5/1931 | Craigo | A61C 13/12 | 29/896.1 |
| 1,814,750 A * | 7/1931 | Fritzenwallner | A61C 11/02 | 433/64 |
| 2,014,289 A * | 9/1935 | Page | A61C 13/12 | 33/513 |
| 2,073,850 A * | 3/1937 | Perkins | A61C 13/12 | 425/177 |
| 2,110,301 A * | 3/1938 | La Porte | A61C 13/20 | 164/307 |
| 2,119,579 A * | 6/1938 | Hagman | A61C 11/003 | 433/64 |
| 2,152,391 A * | 3/1939 | Spahn | A61C 7/08 | 433/136 |
| 2,217,237 A * | 10/1940 | Siqveland | A61C 5/85 | 433/161 |
| 2,282,310 A * | 5/1942 | Dunn | B25B 5/04 | 269/279 |
| 2,305,854 A * | 12/1942 | English | A61C 9/0006 | 24/514 |
| 2,460,079 A * | 1/1949 | Ferree | B25B 1/20 | 269/236 |
| 2,473,643 A * | 6/1949 | Froblom | B25B 1/02 | 248/316.4 |
| 2,511,843 A * | 6/1950 | Graether | B25B 1/12 | 269/134 |
| 2,567,794 A * | 9/1951 | Winett | A61C 5/85 | 433/153 |
| 2,616,320 A * | 11/1952 | Vosper | B25B 1/20 | 269/127 |
| 2,645,013 A * | 7/1953 | Mathison | A61C 5/85 | 433/146 |
| 2,659,146 A * | 11/1953 | Erickson | A61C 5/80 | 433/153 |
| 2,754,591 A * | 7/1956 | Schweizer | A61C 5/80 | 269/254 R |
| 2,851,913 A * | 9/1958 | Ramoneda | B25B 1/24 | 269/127 |
| 3,236,516 A * | 2/1966 | Young | B25B 1/103 | 269/252 |
| 3,427,016 A * | 2/1969 | Harris | B25B 5/068 | 269/215 |
| 3,653,126 A * | 4/1972 | Hansen | A61C 11/08 | 433/60 |
| 3,834,026 A * | 9/1974 | Klein | A61C 3/16 | 433/159 |
| 4,162,625 A * | 7/1979 | Simmons | A61C 13/0003 | 433/34 |
| 4,406,624 A * | 9/1983 | Chervenelekov | A61C 5/77 | 433/156 |
| 4,594,069 A * | 6/1986 | Thompson | A61C 3/16 | 433/161 |
| 4,725,233 A * | 2/1988 | Planert | A61C 3/16 | 433/120 |
| 4,789,146 A * | 12/1988 | Kuei | B25B 1/22 | 269/69 |
| 4,893,801 A * | 1/1990 | Flinn | B25B 5/06 | 269/6 |
| 4,913,860 A * | 4/1990 | Nakaji | A61C 13/20 | 264/16 |
| 4,928,938 A * | 5/1990 | Ross | B25B 1/2452 | 269/283 |
| 5,302,126 A * | 4/1994 | Wimmer | A61C 8/0022 | 433/173 |
| 5,358,404 A * | 10/1994 | Schumacher | A61C 5/50 | 433/164 |
| 5,433,356 A * | 7/1995 | Russell | B25B 1/24 | 224/523 |
| 5,547,380 A * | 8/1996 | Goodman | A61C 3/16 | 433/215 |
| 6,923,647 B2 * | 8/2005 | Gould | A61C 1/07 | 433/116 |
| 7,770,722 B2 * | 8/2010 | Donahoe | A61B 50/30 | 206/63.5 |
| 8,177,416 B2 * | 5/2012 | Muller | A61C 5/68 | 366/208 |
| 8,371,851 B2 * | 2/2013 | Smith | A61C 8/005 | 433/173 |
| 9,393,089 B1 * | 7/2016 | Al-Shehri | G01B 5/0004 | |
| 9,492,249 B1 * | 11/2016 | Lefman | A61C 3/00 | |
| 9,918,809 B2 | 3/2018 | Piasini et al. | | |
| 2004/0043358 A1 * | 3/2004 | Howlett | A61C 8/0087 | 433/141 |
| 2004/0112781 A1 * | 6/2004 | Hofverberg | A61C 8/0087 | 206/363 |
| 2005/0023166 A1 * | 2/2005 | Howlett | A61C 8/0087 | 206/369 |
| 2005/0118552 A1 * | 6/2005 | Coopersmith | A61C 9/0033 | 433/136 |
| 2005/0272006 A1 * | 12/2005 | Rosenberg | A61C 3/16 | 433/159 |
| 2005/0280196 A1 * | 12/2005 | Ray Avalani | B25B 5/068 | 269/6 |
| 2005/0282110 A1 * | 12/2005 | Goodman | A61C 3/16 | 433/141 |
| 2006/0141418 A1 | 6/2006 | Heo | | |
| 2007/0262506 A1 * | 11/2007 | Alberti | B25B 5/163 | 269/249 |
| 2009/0008850 A1 * | 1/2009 | Liou | B25B 5/068 | 269/166 |
| 2010/0285427 A1 * | 11/2010 | Hung | A61C 8/0089 | 433/174 |

(56) References Cited

U.S. PATENT DOCUMENTS

| | | | |
|---|---|---|---|
| 2013/0230825 A1* | 9/2013 | Kenk | A61C 8/0089 433/163 |
| 2014/0154643 A1 | 6/2014 | Benzon | |
| 2014/0205969 A1 | 7/2014 | Marlin | |
| 2014/0227661 A2* | 8/2014 | Guenter | A61C 8/0087 433/163 |
| 2016/0361150 A1* | 12/2016 | Berndt | A61L 2/14 |
| 2017/0326027 A1* | 11/2017 | Moore | A61H 39/04 |
| 2019/0381632 A1* | 12/2019 | Wang | B25B 5/102 |
| 2021/0354270 A1* | 11/2021 | Cate | B25B 5/16 |
| 2022/0023012 A1* | 1/2022 | Ziff | A61C 8/0048 |

FOREIGN PATENT DOCUMENTS

| | | | | |
|---|---|---|---|---|
| CH | 388218 A | * | 2/1965 | B25B 5/109 |
| CN | 1750797 A | | 3/2006 | |
| CN | 101522130 A | * | 9/2009 | A61C 8/0065 |
| DE | 102006036715 A1 | | 2/2008 | |
| DE | 202015103851 U1 | * | 8/2015 | A61C 8/0087 |
| EP | 0172381 A2 | * | 2/1986 | A61M 39/283 |
| EP | 1260191 A2 | * | 11/2002 | A61C 8/0048 |
| EP | 2949287 A1 | * | 12/2015 | A61C 8/0054 |
| FR | 2906997 A1 | * | 4/2008 | A61B 17/30 |
| KR | 101426380 B1 | | 8/2014 | |
| WO | WO-9852490 A1 | * | 11/1998 | A61C 13/2656 |
| WO | WO-2008022635 A2 | * | 2/2008 | A61C 8/005 |
| WO | WO-2008154947 A1 | * | 12/2008 | A61C 8/005 |
| WO | WO-2015155283 A1 | * | 10/2015 | A61C 13/0001 |

OTHER PUBLICATIONS

Muller, "FR_2906997_A1_I_translated" (Year: 2008).*
Jolt, "DE_202015103851_U1_translated" (Year: 2015).*

* cited by examiner

SUPRA STRUCTURE ABUTMENT HOLDER AS WELL AS PROCESS FOR PROVIDING A BONDING GAP

CROSS-REFERENCE TO RELATED APPLICATIONS

This application is a National Stage application of International patent application No. PCT/EP2017/079588 filed on Nov. 17, 2017, which claims priority to European patent application No. 16204291.5 filed on Dec. 15, 2016, all the disclosures of which are incorporated herein by reference in their entirety.

FIELD OF THE INVENTION

The invention concerns a supra structure abutment holder as well as a related process.

BACKGROUND OF THE INVENTION

It has been known for a long time to use, for providing the connection between an implant of a dental restoration part and the supra structure, what is referred to as an abutment, as an intermediate body.

Such solutions have been known for decades; reference should be made here, only by way of example, to U.S. Pat. No. 4,657,510 A1.

Typically, the construction is carried out in such a fashion that the implant is anchored in the patient's bone in a basically known fashion. An abutment is attached inside of or to the implant, which is typically done with the help of what is referred to as an implant screw which passes through the abutment. The abutment insofar forms a safely anchored basis for accommodating the supra structure.

For attaching the supra structure, the abutment neck and the abutment collar are formed in such a fashion, in most cases, that a smooth transition between implant/abutment/supra structure is guaranteed on the one hand, and the chewing forces acting on the supra structure may be safely absorbed and distributed on the other hand.

In order to put this into practice, the supra structure is typically connected with the abutment, especially the abutment neck, by means of a positive fit, which is, with the help of a special dental cement, such as, for example "Multilink Hybrid Abutment" of company Ivoclar Vivadent AG. In the selection of the adhesive, particular attention is paid to it that the adhesion is particularly good both to titanium as a material out of which an abutment is frequently produced, and a ceramic or composite material as a material which is used for the supra structure.

During the curing process, influences of humidity, such as saliva, should play no role. In general, the solubility in water and absorption of water of the adhesive or dental cement should be particularly low.

Another aspect is biocompatibility, such that the producers of such adhesives have generally paid great attention to providing the biocompatibility of such cements or adhesives.

In order to perform the bonding step, two processes are basically possible: On the one hand, it is possible to apply the adhesive to the inside of the supra structure and then press the supra structure onto the abutment. Herewith, however, the bonding process itself may be influenced only to a very low degree, such that the adhesive connection between abutment and supra structure is typically established in advance—when the implant screw is inserted.

For instance, the dentist or dental technician may clamp the abutment, if necessary also using another implant or an implant analog. He may in particular clamp the abutment with the help of a screw there and attach the abutment in this way. Then he applies the adhesive and subsequently carries out the bonding process in accordance with the manufacturers' specifications by pressing and pushing the supra structure onto the abutment, that is, especially the abutment neck.

Alternatively, the abutment may be placed on the implant and held there even without a screw, with the help of an anti-turn locking device.

The accessibility of the implant screw is given thanks to a penetrating recess within the occlusal surface of the supra structure. After the adhesive has been applied, the abutment is then attached to the already implanted implant via the implant screw together with a supra structure already attached thereon.

This succession in the production of a dental restoration, which has been carried out for decades, however, repeatedly entails problems, some of which lead to cases of liability: Although one attempts, of course, to observe the manufacturer's specifications, the supra structure sometimes comes loose of the abutment, such that there is the risk of the supra structure possibly being swallowed.

In almost 50% of all cases, it is also necessary to carry out rather complex reworks in order to correct occlusal malalignments, and in part, additional material must be applied, too, which is then at the risk of being lost.

Therefore it is suggested to hold the supra structure and the abutment under some preload during the bonding process. Although this suggestion leads to certain improvements, it is not able to entirely prevent the problems.

SUMMARY OF THE INVENTION

Therefore, the invention is based on the task of creating a supra structure abutment holder according to the claims and a process according to the claims, that is more delicate and optimises the work processes when providing the dental restoration.

This task is solved, in accordance with the invention, by the claims. Advantageous further embodiments result from the subordinate claims.

A supra structure abutment holder in accordance with the invention consists of a firmly connected unit made up of a supra structure and an abutment which positively fits the supra structure, as well as a holder which overlaps both supra structure and abutment and holds them together and herewith forms the connection between the supra structure and abutment.

For mounting a supra structure and an abutment, the supra structure abutment holder in accordance with the invention is provided with a clamping device which acts together with an auxiliary device. The auxiliary device is preferably provided with a possibility for height adjustment, such as threads, a detent, or any other possibility for height adjustment with the help of which the relative height between the auxiliary element and the clamping device can be adjusted.

In accordance with the invention, a certain bonding pressure should not only be exerted on the bonding gap between abutment and supra structure by means of the clamping device, but this bonding pressure should also be precisely adjustable with the help of the height adjustment.

In addition, the height adjustment also precisely determines the dimensions of the bonding gap. Alignment mistakes due to an inclination of the supra structure towards the abutment may be safely avoided with the help of the integrated unit of the supra structure abutment holder in accordance with the invention.

Preferably, the associated threads for height adjustment are fine-pitch threads, and the auxiliary device and/or the clamping device are formed to be elastic in such a fashion that they are provided with spring characteristics which are suitable for providing the desired bonding pressure. When adjusting the bonding pressure, the viscosity of the cement or adhesive may also be taken into account.

For example, the auxiliary device may be assigned to the supra structure and be provided with depressions into which occlusal protrusions, such as cusps or cutting edges, of the supra structure may enter. The auxiliary device may then be provided with depressions, like some sort of elastic cylinder disc which is overlapped by tractive elements or a portion of the clamping device and exerts a precisely adjustable pressure as the bonding pressure. The auxiliary device is insofar positively connected with the supra structure.

The auxiliary device further guarantees true-to-position clamping of the restoration or the supra structure, respectively, in the supra structure abutment holder in accordance with the invention.

Herein, auxiliary device and clamping device may be single-piece or multiple-piece with relation to each other.

In a preferred embodiment, based on the CAD data of the supra structure, a CAM device should cut out the depressions of the auxiliary device. In this case, a cylinder disc may be used as the auxiliary device.

It may consist of some solid material, such as PMMA, for instance.

In one exemplary embodiment, certain tractive elements are part of the auxiliary device for exerting the clamping force in the supra structure abutment holder. The threaded engagement is preferably provided between these tractive elements and the clamping device.

It is also possible to form the clamping device in two pieces instead, such that a portion of the clamping device may be adapted in its height relative to another portion of the clamping device. The tensile forces which must be transferred onto the auxiliary device for pressing the supra structure to the abutment are then transferred with the help of tractive elements as part of the clamping device.

Insofar, independently of the embodiment, the arrangement of supra structure and abutment is retained clamped between auxiliary device and clamping device. Clamping is supposed to mean here that the auxiliary device or the clamping device presses onto the supra structure virtually from "above", i.e. from the occlusal side, and the respective other device onto the abutment from "below", i.e. from the basal side. It is to be understood that this observation of "above" and "below" is correct with dental restorations for the lower jaw, whereas with dental restorations for the upper jaw, the situation of above and below is vice versa, respectively. That is, the clamping device is adjustable along the axis of the supra structure and the abutment.

However, it is also possible to have the auxiliary device act onto the abutment, and the clamping device onto the supra structure.

The essential thing is only the pressure of the parts concerned towards each other, for the adjustable provision of the bonding pressure.

In a surprisingly simple fashion, the desired bonding pressure may also be adjusted with the help of a torque handle, for example, which acts onto an Allen connection inside the clamping device. The torque thus pre-determined is proportional to the desired bonding pressure, at least in areas in which the bonding gap is not smaller than a pre-determined dimension of, for example 20 to 150 µm, in particular 50 µm.

In accordance with the invention, it is particularly favourable that, thanks to the direction realised symmetrically to the central axis of the abutment in which the clamping pressure is built up, the bonding gap is homogenized. Crooked pressure, which would lead to the bonding gap being too low in one place, and too wide in a further place, is thus safely avoided.

In the case of molars, recesses or depressions may be provided for this purpose, for instance, in the area of the auxiliary device, which are able to positively accommodate the cusps of the molar in question. For this purpose, the auxiliary device is preferably elastic, such that the supra structure may impress there with the occlusional surface additionally to the depression.

In an advantageous embodiment, the auxiliary device is provided as an exchangeable disc which is provided with a depression for incisors or cuspids, respectively, on one side, and a double depression for molars on the other side.

The auxiliary device may preferably be overlapped by the tractive element or the tractive elements, such that the desired pressure is exerted onto the combination of supra structure and abutment.

The abutment neck is typically adapted to the height of the supra structure in its length. Here, it has turned out to be particularly favourable to provide the abutment neck in three pre-determined lengths, i.e. small, medium and large, in order to allow safe guidance.

The supra structure is always produced in such a fashion that it has some excess compared with the outer diameter of the abutment neck, which corresponds to the desired bonding gap. By way of example, a width of the bonding gap of 150 µm be assumed here.

In the area of the abutment collar, however, there should also be a bonding gap, the size of which preferably corresponds to the width of the neck bonding gap, but which may also be selected to be larger or smaller. This bonding gap may now be adapted, in accordance with the invention, by performing a height adjustment of the relative position of abutment and supra structure with the help of the auxiliary device.

The higher the pressure exerted by the auxiliary device and the clamping device onto the combination of supra structure and abutment, the smaller the bonding gap will become at the axial surfaces of the abutment in question.

Axial surfaces should mean those surfaces here whose surface normals extend in a fashion parallel to the axis of the abutment, or inclined towards the axis of the abutment, but in any case not radially.

Except for the insofar axial bonding surfaces, in accordance with the invention, also the radial bonding surface at the abutment neck is preferably homogenized: this is obviously due to the fact that, as a result of the depressions in the auxiliary device which is positively connected with the clamping device with the help of the tractive elements, a centring is performed. This happens, on the one hand, as a result of the elasticity of the disc as the auxiliary device, and on the other hand by means of a clever selection of the arrangement of the depressions in question.

In a modified embodiment, the surface form of the supra structure which is provided by means of CAD, i.e. in digital form, anyway, should be formed into the auxiliary device at the occlusal side as a negative form. As a result of this, an exact positive fit between the auxiliary device and the supra structure may be guaranteed which makes possible an even better centring and homogenization of the radial bonding gap.

In this case, the auxiliary device may consist of some solid material, such as PMMA, which means it is not elastic.

BRIEF DESCRIPTION OF THE DRAWINGS

Further advantages, aspects, and features result from the subsequent description of one exemplary embodiment of the invention with the help of the drawings, which show.

DETAILED DESCRIPTION

Figure 1:
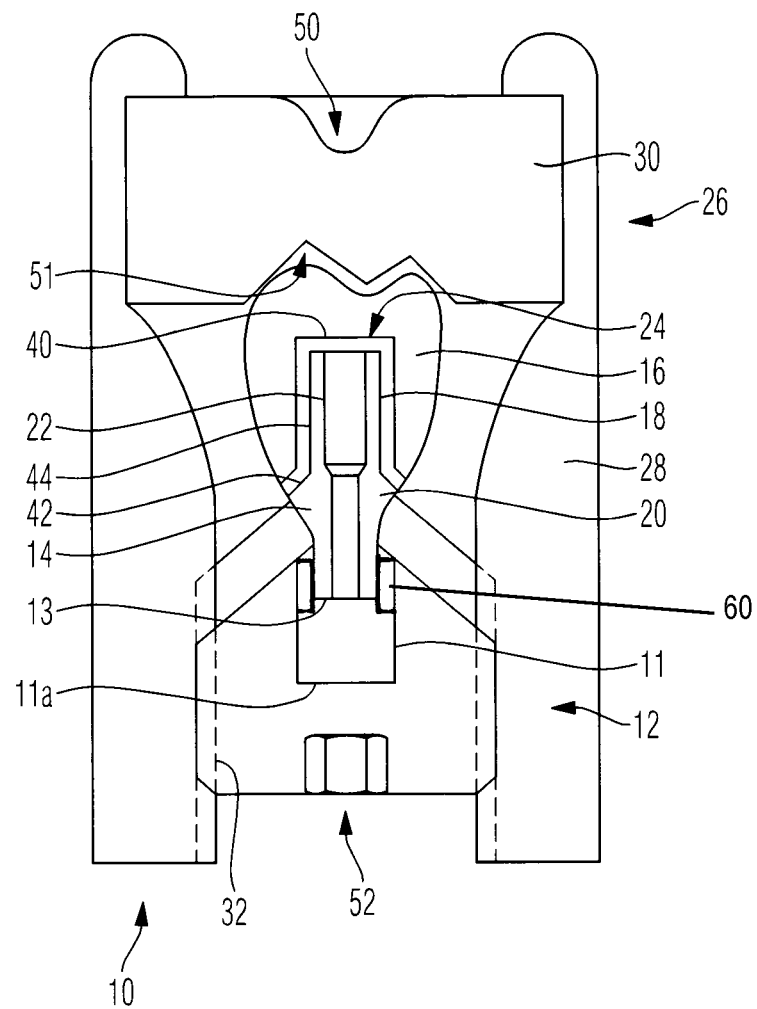
FIG. 1 a schematically depicted embodiment of the supra structure abutment holder in accordance with the invention.

The embodiment of the supra structure abutment holder 10 in accordance with the invention, which is depicted in FIG. 1, is provided with a clamping device 12. An abutment 14 has been inserted into clamping device 12, which has been done with positive fit at a portion of the abutment which is close to an implant.

Clamping device 12 is provided with an abutment interface receptacle 13 which has in particular the shape of a blind hole and is provided with the geometry of an anti-turn locking device for abutment 14.

This makes it possible to use the supra structure abutment holder 10 in accordance with the invention merely for the pre-determined abutment system or implant system, respectively, but not for other different abutment systems or implant systems, respectively.

Clamping device 12 is additionally provided with an interface 11 for abutment 14, via which interface abutment 14 is connected to clamping device 13. The base surface 11a of interface 11 may be in the shape of a hexagon.

A supra structure 16 is positioned onto abutment 14 in a basically known fashion.

Abutment and supra structure should be bonded to each other by means of connecting a suitable adhesive. For this purpose, a bonding gap 18 is formed which, starting from an abutment collar 20, extends along an abutment neck 22 up to an abutment face 24, and is filled with a basically known dental cement or dental adhesive. As the dental adhesive, use of Vivaglas CEM PL or of Multilink Hybrid Abutment, both from the present Applicant, have turned out to be particularly favourable.

Other dental cements, however, are not excluded from use in accordance with the invention.

In the not cured state, the dental cement is viscous, wherein the viscosity is different, depending on the dental cement, but also depending on the environmental conditions, such as temperature.

In accordance with the invention, supra structure abutment holder 10 is provided, besides the clamping device, with an auxiliary device 26 as well. In the exemplary embodiment depicted, the auxiliary device 26 consists of a tractive element 28 and a disc 30. Tractive element 28 overlaps the disc, such that the disc is able to exert pressure in the direction of the supra structure, which is finally in the direction towards clamping device 12.

In accordance with the invention, a height adjustment device 32 is provided between clamping device 12 and auxiliary device 26, in the embodiment depicted between clamping device 12 and tractive element 28. The height adjustment device 32 may, for example, be shaped as a fine-pitched thread, wherein it is also possible, however, to provide any other adjustable positive connection, for example a fine grating.

In accordance with the invention, the adjustment is done in such a fashion that an altitude between the undersurface of disc 30 and the upper surface of clamping device 12 is pre-determined. The altitude corresponds to the desired thickness of bonding gap 18, or, to be more precise, of axial bonding gaps 40 and 42. For determining the pre-determined altitude, the geometry of disc 30 and the maximum axial travel range of height adjustment device 32 must be taken into account.

Axial bonding gap 40 extends at abutment face 24, and axial bonding gap 42 extends at abutment collar 20.

Opposite of this extends a radial bonding gap 44 at abutment neck 22.

In disc 30 as a part of auxiliary device 26, depressions 50 are formed in accordance with the invention. Preferably, a double depression 51 is formed at the undersurface of disc 30, on the one hand for the vestibular cusps, and on the other hand for the oral cusps of molars, and at the upper side of disc 30 a single depression 50 for incisors or cuspids. Depending on the supra structure 16 to be bonded, disc 30 is left in the position depicted in the Figure, or is turned around.

Disc 30 may also be referred to as a block, and the outer shape of the disc 30 is not restricted to the embodiment depicted according to the Figure; both a round and an angular embodiment of block 30 are possible without departing from the scope of the invention.

In an advantageous embodiment, auxiliary device 26 has two parts and in particular in the area of flat cylindrical block 30 and/or tractive element 28 it is elastic or flexible. As a result of the flexibility, the desired bonding pressure may be adjusted in addition, corresponding to the force acting onto the bonding gap between supra structure 16 and abutment 14.

In an advantageous embodiment, tractive element 28 should be provided with a transparent envelope or sleeve, or with braces or struts, in particular with 2 braces or struts, preferably with 3 braces or struts, which mount disc 30 in a tripodised fashion. This allows the free visibility of axial bonding gap 42 towards the gingival end of supra structure 16.

In the exemplary embodiment depicted, clamping device 12 is provided with a fine-pitch thread at its radial outer surface, which thread is in engagement with the corresponding female fine-pitch thread of auxiliary device 26.

For the height adjustment, clamping device 12 may be rotated correspondingly relative to auxiliary device 26. For this purpose, a hexagonal recess 52 is formed centrally inside clamping device 12. The hexagonal recess 52 is suited for the engagement of an Allen key in a basically known fashion.

The height adjustment can now preferably be done in such a fashion that clamping device 12 is tightened until the adhesive is visible at all sides of abutment collar 20. In this state, an automatic centring and homogenization of the bonding gap has already been performed, and the adhesive may then be cured in a basically known fashion, whether this be with the help of light, with the help of heat, or also by its being self-curing.

In an advantageous embodiment, in order to block the leakage of adhesive at abutment neck 22, a packing body should be inserted into abutment neck 22 as an adhesion-assisting element. The packing body should be removed before inserting the abutment screw.

It is to be understood that the invention is not restricted to the exemplary embodiment depicted. For instance, it is possible without any problem to kinematically exchange the positions of clamping device 12 and auxiliary device 26, i.e. provide auxiliary device 26 close to abutment 14, and clamping device 12 close to supra structure 16. In accordance with the invention, the important thing is in any case the adjustability in height between clamping device and auxiliary device.

Figure 2:
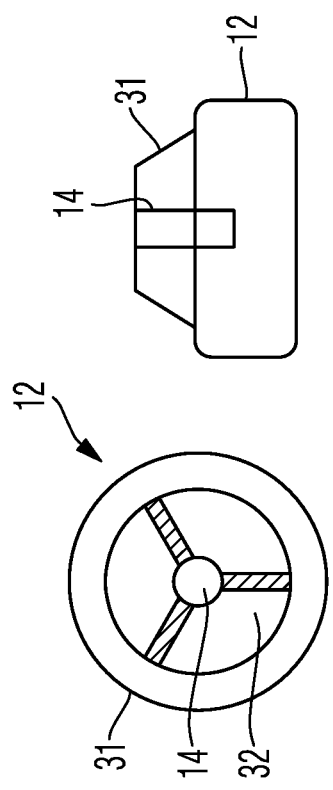
FIG. 2 an arrangement with a partially depicted abutment and a clamping device of a further embodiment of the supra structure abutment holder in accordance with the invention in a top view and a side view.

In the embodiment which is depicted according to FIG. 2, abutment 14 is clamped with the help of a clamp chuck 31 of clamping device 12. For this purpose, three clamping jaws 32 are provided. By means of screwing in clamping jaws 32, abutment 14 is kept clamped in a basically known fashion.

In an embodiment which is not depicted, an implant analog is provided as the abutment receptacle, which is also provided with a blind hole for accommodating abutment 14. An anti-turn locking device which extends axially at the inner surface of the blind hole may be provided as well.

Figure 3:
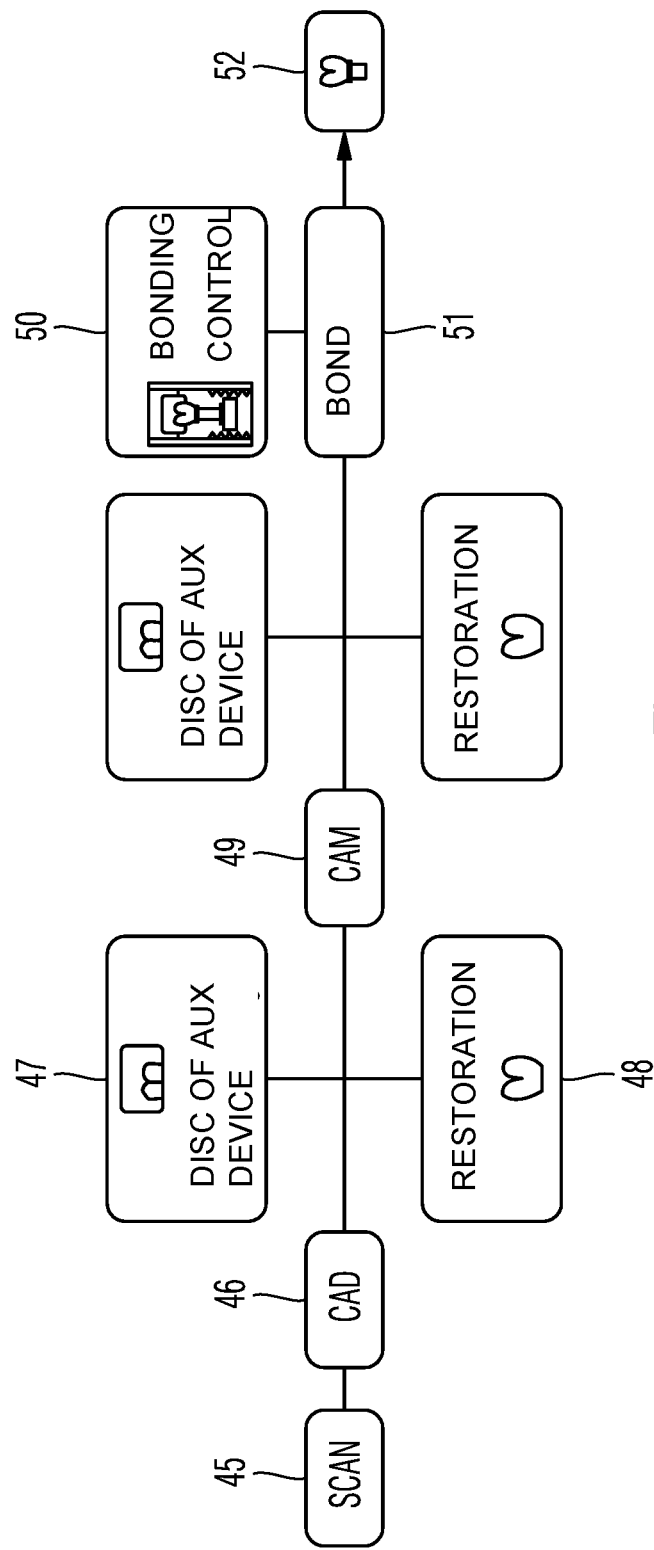
FIG. 3 a block diagram for the production of the supra structure abutment holder in accordance with the invention and the bonding process.

According to FIG. 3, digital data of the relevant tooth are first obtained with the help of a scanning process 45. Subsequently, based on this, CAD data concerning the dental restoration 48 to be produced and an individual disc of the auxiliary device (i.e. of bond aid inlet 47) are generated with the help of a CAD software 46.

These CAD data serve both as a production order for a subsequent additive or subtractive production process 49 and as a pre-condition for calculating the force which is to be exerted onto bonding gap 18 between supra structure 16 and abutment 14 and which is to be adjusted, or the height adjustment value, which is performed with the help of a simulation software.

Subsequently, bonding process 51 is performed with disc 47 as well as tractive element 28 with the help of clamping device 12 in accordance with the invention and auxiliary device 26 in accordance with the invention. This finally leads to a successful finishing of the arrangement of supra structure and abutment.

The invention claimed is:

1. A system comprising
a supra structure abutment holder comprising a clamping device (12), and an auxiliary device (26), wherein the auxiliary device comprises a tractive device (28) and a flat block (30),
a supra structure (16), and
an abutment (14),
wherein the supra structure and the abutment are clamped between the auxiliary device (26) and the clamping device (12) and are held in positive-fit engagement with each other,
wherein the clamping device (12) comprises threads for adjusting a height, relative to the auxiliary device (26), wherein the clamping device (12) is both disposed along and adjustable along a longitudinal axis of the supra structure (16) and the abutment (14),
wherein the flat block (30) is provided to be flexible, or is provided with a surface which is flexible and facing towards the supra structure, and is elastically deformed by an incisal or an occlusal surface of the supra structure (16),
wherein the flat block (30) is provided on one side, with depressions for accommodating the occlusal surface of the supra structure and/or, on the other side, at least one depression for accommodating the incisal surface of the supra structure,
wherein the tractive device (28) overlaps the flat block (30), such that the flat block (30) exerts pressure in the direction of the supra structure (16),
wherein the clamping device (12) is configured to clamp the supra structure (16) and then abutment (14) in place along the longitudinal axis,
wherein the positive-fit engagement made up of the supra structure (16) and the abutment (14) is accessible from a side while clamped between the auxiliary device (26) and the clamping device (12), and a bonding gap (18) is visible.

2. The system according to claim 1,
wherein the threads are self-retaining and are formed as fine-pitch threads.

3. The system according to claim 1, wherein the clamping device (12) is provided with a recess, for accommodating the abutment (14), which is adapted to the length and/or the thickness of the lower portion of the abutment (14) or an abutment analog.

4. The system according to claim 3, wherein the recess comprises a blind hole and wherein the system further comprises an abutment socket comprising an implant analog.

5. The system according to claim 4,
wherein the blind hole has a diameter which corresponds to the diameter of a largest diameter of the abutment (14) or the abutment socket.

6. The system according to claim 1,
wherein via the adjustment of the clamping device (12), a force applied to the bonding gap (18) between the supra structure (16) and the abutment (14) is adjusted due to the elastic deformation of the flat block (30).

7. The system according to claim 6,
wherein the adjustment concerns the relative altitude of the auxiliary device (26) and the clamping device (12) with respect to each other.

8. The system according to claim 1,
wherein the flat block (30) is a pancake cylinder.

* * * * *